US012448020B2

(12) United States Patent
Tutt et al.

(10) Patent No.: US 12,448,020 B2
(45) Date of Patent: Oct. 21, 2025

(54) PRAM FRAME WITH ROLLER SET

(71) Applicant: AREA 52 LTD, Aberdeenshire (IE)

(72) Inventors: Matthew Karl Tutt, Aberdeenshire (GB); Stephen Paul Wilding Senior, Aberdeenshire (GB)

(73) Assignee: AREA 52 LTD, Aberdeenshire (GB)

( * ) Notice: Subject to any disclaimer, the term of this patent is extended or adjusted under 35 U.S.C. 154(b) by 110 days.

(21) Appl. No.: 17/923,536

(22) PCT Filed: Apr. 30, 2021

(86) PCT No.: PCT/GB2021/051043
§ 371 (c)(1),
(2) Date: Nov. 4, 2022

(87) PCT Pub. No.: WO2021/224595
PCT Pub. Date: Nov. 11, 2021

(65) Prior Publication Data
US 2023/0202547 A1 Jun. 29, 2023

(30) Foreign Application Priority Data
May 4, 2020 (GB) ...................................... 2006561

(51) Int. Cl.
*B62B 7/04* (2006.01)

(52) U.S. Cl.
CPC .............. *B62B 7/042* (2013.01); *B62B 7/044* (2013.01); *B62B 2301/04* (2013.01); *B62B 2301/06* (2013.01); *B62B 2301/254* (2013.01)

(58) Field of Classification Search
CPC ........... B62B 7/042; B62B 7/044; B62B 7/04; B62B 7/00; B62B 2301/04; B62B 2301/06; B62B 2301/254; B62B 2301/0463; B62B 2301/252; B62B 2301/00; B62B 2301/046; B62B 2301/25
See application file for complete search history.

(56) References Cited

U.S. PATENT DOCUMENTS

| | | | |
|---|---|---|---|
| 6,854,745 B2 * | 2/2005 | Driessen ................. | B62B 7/042 280/47.38 |
| 6,916,032 B2 * | 7/2005 | Wong .................... | A61G 5/1024 280/250 |

(Continued)

FOREIGN PATENT DOCUMENTS

| | | |
|---|---|---|
| CA | 2032281 C | 6/1992 |
| CN | 201183507 Y | 1/2009 |

(Continued)

OTHER PUBLICATIONS

Application No. GB2006561.1 Examination Report dated May 22, 2023, 6 pages.

(Continued)

*Primary Examiner* — James M Dolak
(74) *Attorney, Agent, or Firm* — Cozen O'Connor (57) ABSTRACT

There is provided a pram frame (200) comprising a first roller attachment point (221) configured to engage with a first roller set (121) and a mechanism (231) configured to engage with the first roller set (121) via the first roller attachment point (221). The mechanism (231) is configured to provide driven steering of the first roller set (121) when a user steers the pram frame (200).

17 Claims, 4 Drawing Sheets

(56) References Cited

U.S. PATENT DOCUMENTS

| | | | | |
|---|---|---|---|---|
| 7,118,116 | B2 * | 10/2006 | Lin | B62B 9/18 |
| | | | | 280/47.38 |
| 7,699,325 | B2 * | 4/2010 | Durbin | B62B 7/04 |
| | | | | 280/47.11 |
| 7,744,102 | B2 * | 6/2010 | Bailey | B62B 7/04 |
| | | | | 280/47.38 |
| 8,146,926 | B2 * | 4/2012 | Durbin | B62B 7/04 |
| | | | | 280/47.11 |
| 8,292,327 | B2 * | 10/2012 | Araya Moreno | B60B 33/025 |
| | | | | 280/771 |
| 8,678,404 | B2 * | 3/2014 | Chaudeurge | B60B 33/023 |
| | | | | 16/45 |
| 8,814,183 | B1 * | 8/2014 | Durbin | B62B 7/044 |
| | | | | 280/47.38 |
| 9,656,682 | B2 * | 5/2017 | Ahlemeier | B62B 9/08 |
| 11,161,539 | B2 * | 11/2021 | Day | B62K 13/04 |
| 11,572,093 | B2 * | 2/2023 | Yoo | B62K 15/00 |
| 12,208,852 | B2 * | 1/2025 | Lakos | B62K 13/04 |
| 12,221,149 | B2 * | 2/2025 | Drummond | B62B 5/0036 |
| 2010/0066044 | A1 | 3/2010 | Kim | |
| 2014/0117636 | A1 * | 5/2014 | Gilbert | B60B 33/006 |
| | | | | 280/80.1 |
| 2017/0341673 | A1 * | 11/2017 | Morley | B62B 9/18 |

FOREIGN PATENT DOCUMENTS

| | | |
|---|---|---|
| CN | 103552585 A | 2/2014 |
| CN | 107351900 A | 11/2017 |
| CN | 109572790 A | 4/2019 |
| DE | 20110388 U | 10/2001 |
| DE | 20310604 U1 | 9/2003 |
| GB | 1510011 A | 5/1978 |
| GB | 2559814 A | 8/2018 |
| KR | 101523578 B | 6/2015 |
| WO | WO 2006024380 A2 | 3/2006 |
| WO | WO 2008145523 A2 | 12/2008 |
| WO | WO 2020212401 A1 | 10/2020 |

OTHER PUBLICATIONS

Application No. GB2006561.1 Search Report dated Oct. 1, 2020, 4 pages.

International Patent Application No. PCT/GB2021/051043, International Search Report and Written Opinion dated Aug. 27, 2021, 8 pages.

* cited by examiner

PRAM FRAME WITH ROLLER SET

FIELD

The invention relates to a pram frame configured to provide driven steering of the pram frame, or a pram of which the frame is a part.

BACKGROUND TO THE INVENTION

A pram typically comprises a pram frame. A pram also typically comprises pairs of wheels attached to the pram frame so that the pram can be pushed by a user. These wheels usually are each free to rotate about the plane of their circular faces, in other words around an axle or similar that is generally perpendicular to those faces. Resultingly, the direction in which the wheels are orientated when the pram is steered may change suddenly or even somewhat unpredictably. Significant effort on the part of the user may be required to control the motion, in particular the direction of travel, of the pram. In other words, it is sometimes difficult to push a pram in a desired direction, or with desired levels of control or precision. For example, it is typically difficult to navigate corners or bends. Attempts by the user to control the direction of the pram are frequently cumbersome, disruptive and may require significant user strength and flexibility. For example, to navigate a corner, the pram may need to have fixed-direction rear wheels dragged around a corner, or even have the rear of the pram lifted to achieve the required cornering.

Moreover, a pram frame with pairs of wheels attached as described above is usually restricted to use in certain environments, because the wheels are not suitable for some terrains. For example, rocky or uneven surfaces may be difficult surfaces over which to push the pram, because wheels are not able to overcome obstructions, such as rocks in the case of a rocky surface. Even if the wheels are able to overcome such obstacles the cargo of the pram (i.e. the object or objects being carried by the pram) may be disturbed or damaged by the motion, such as vibrations, caused by pushing the wheels of the pram over the obstacles. Difficulties in overcoming obstacles are exacerbated by difficulty in controlling the motion of the pram.

Hence, there is a need for a pram frame for a pram that enables better control of the orientation of the wheels as the pram is being pushed, such that the pram can navigate corners and the like as well as being easily pushed in a straight line. Similarly, there is a need to provide a pram frame that enables the pram to be pushed over uneven surfaces without affecting the cargo of the pram or hampering the user. Overall, there is a desire to provide a pram frame that facilitates a pram that is generally easy to control and which is comfortable to use and be carried in (e.g. from the perspective of a baby or small child).

SUMMARY OF THE INVENTION

It is one aim of the present invention, amongst others, to provide a pram frame which at least partially obviates or mitigates at least some of the disadvantages of the prior art, whether identified herein or elsewhere, or to provide an alternative approach. For instance, it is an aim of embodiments of the invention to provide a pram frame that provides driven steering. For instance, it is an aim of embodiments of the invention to provide a pram frame that can be used in diverse physical environments.

According to the present invention there is provided a pram frame, and pram, as set forth in the appended claims. Other features of the invention will be apparent from the dependent claims, and the description that follows.

According to a first aspect, there is provided a pram frame comprising a first roller attachment point configured to engage with a first roller set and a mechanism configured to engage with the first roller set via the first roller attachment point. The mechanism is configured to provide driven steering of the first roller set when a user steers the pram frame.

The pram frame may further comprise a second roller attachment point configured to engage with a second roller set.

The mechanism may be configured to engage with the second roller set via the second roller attachment point.

The mechanism may be configured to provide driven steering of the second roller set when a user steers the pram frame.

The mechanism may be configured to engage with a user input device and configured to select driven steering of at least one of the first roller set and the second roller set in response to a user input received by the user input device.

At least one of the first roller set and the second roller set may be configured to be locked in a state for driven steering in the event that driven steering is selected.

In the event that driven steering is selected for the first roller set and the second roller set, a ratio of driven steering of the first roller set with respect to the second roller set may be the same.

In the event that driven steering is selected for the first roller set and the second roller set, a ratio of driven steering of the first roller set with respect to the second roller set may be different.

The first roller attachment point may be at the front of the pram frame and the second roller attachment point may be at the rear of the pram frame, the front of the pram frame being the direction in which the pram frame is pushed by the user.

The first roller attachment point may be configured to engage with a ball as the first roller set.

The second roller attachment point may be configured to engage with a set of wheels as the second roller set.

The mechanism may comprise one or more actuators for interacting with at least one of the first roller attachment point and the second roller attachment point.

A sensitivity of the driven steering provided by the mechanism to the steering of the pram frame by the user may be defined by a scale factor.

The scale factor may be at least one of fixed and adjustable.

According to a second aspect, there is provided a pram, comprising a pram frame according to the first aspect.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

Figure 1:
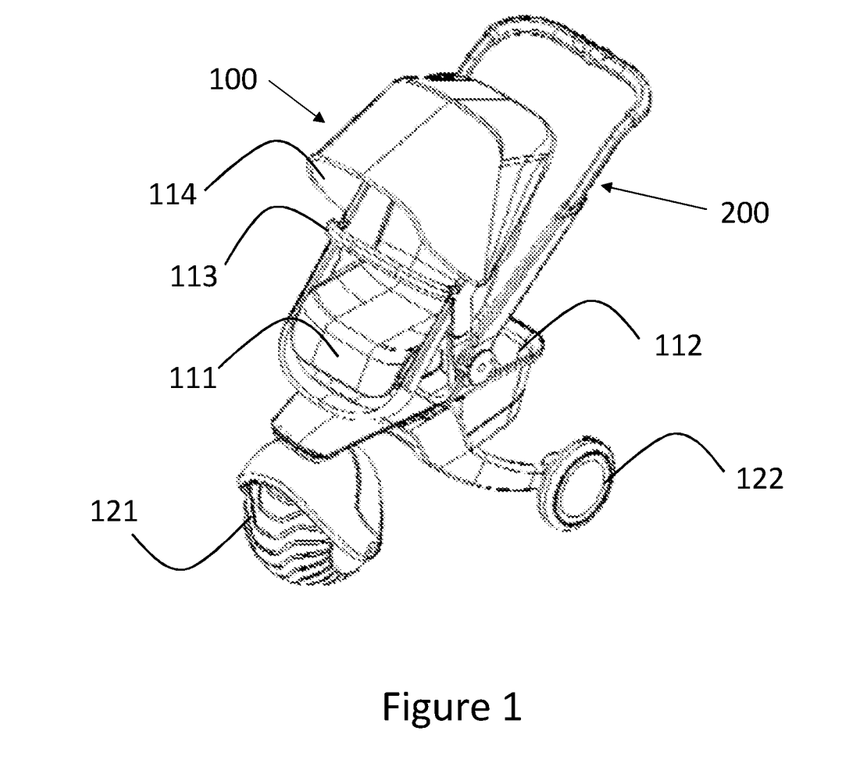
FIG. 1 schematically depicts a pram including a pram frame according to an exemplary embodiment.

FIG. 1 schematically depicts a pram 100 including a pram frame 200 (see later Figures for the pram frame 200 in isolation from the pram 100) according to an exemplary embodiment. The pram frame 200 is shown in FIG. 1 as part of a pram 100 in order to enable better understanding of the invention and to give context to the invention. The pram frame 200 typically comprises a light but durable material, such as plastic. The pram frame 200 may also comprise metal, for example. The pram frame 200 is not limited to a particular material or geometry.

The pram 100, as shown in FIG. 1, includes a seat 111 and a basket 112 for carrying a cargo of the pram 100. The seat 111 and the basket 112 are attached to the pram frame 200. For instance, a child may sit in the seat 111, and the belongings of a user of the pram 100 may be placed in the basket 112. As shown in FIG. 1, a bar 113 to be gripped by the child seated in the seat 111 is attached to the seat 111. Also shown in FIG. 1 is a hood 114 to shield the, for example, child seated in the seat 111 from the environment (e.g. the hood may prevent the child from getting wet during rainy weather). The basket 112 may comprise a lid, which may be lockable. The seat 111 and the basket 112 may be made of a same or a different material than the pram frame 200.

The pram 100 of FIG. 1 also comprises a first roller set 121 and a second roller set 122, as is discussed in more detail below. The rollers of the roller sets 121, 122 are rotatable to allow the pram 200 to be pushed by the user. Commonly used rollers include wheels. A ball may also be used with the pram 100 of FIG. 1, as described in more detail below.

Figure 2A:
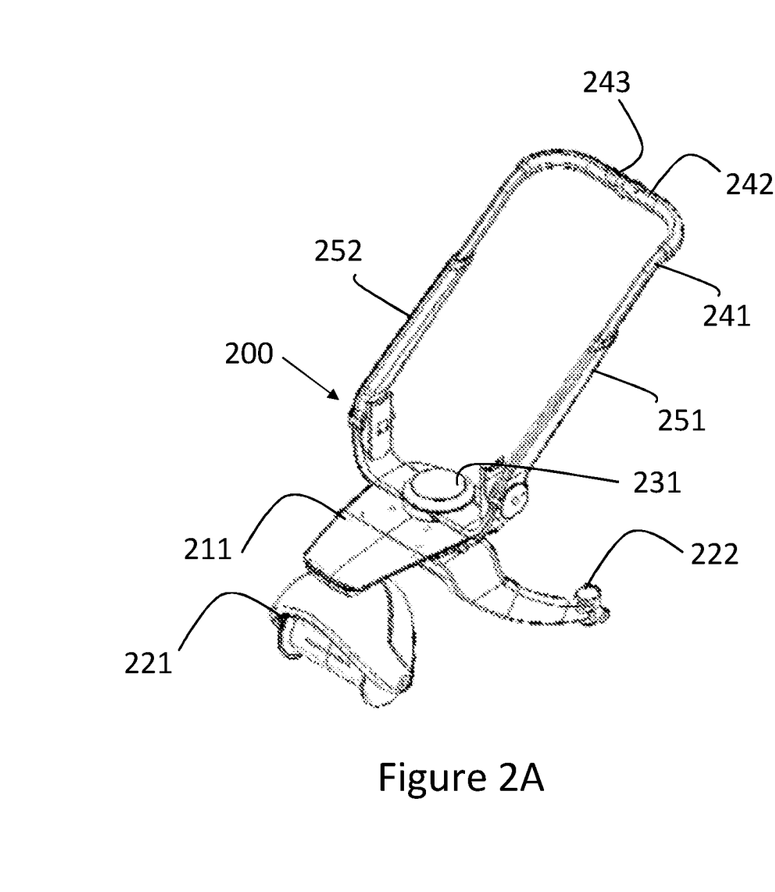
FIG. 2A schematically depicts the pram frame of FIG. 1 according to an exemplary embodiment.
Figure 2B:
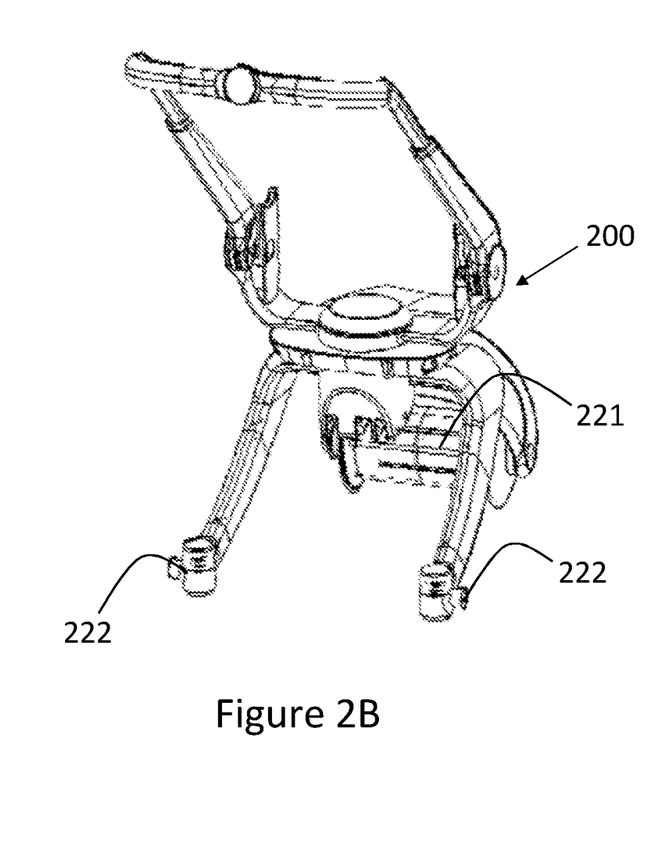
FIG. 2B schematically depicts the pram frame of FIG. 1 from the rear according to an exemplary embodiment.
Figure 3A:
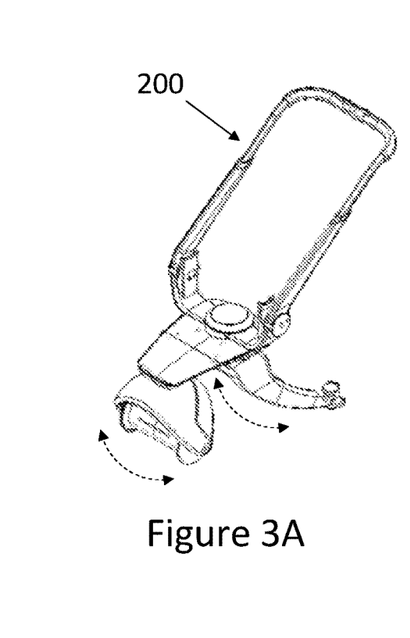
FIG. 3A schematically depicts the pram frame of FIG. 2A in which driven steering is not provided according to an exemplary embodiment.
Figure 3B:
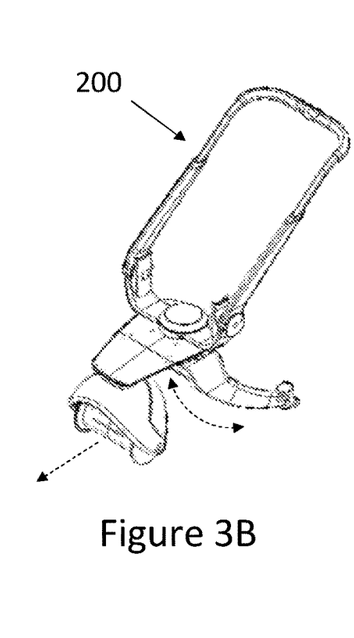
FIG. 3B schematically depicts the pram frame of FIG. 2A in which driven steering is provided for a first roller set according to an exemplary embodiment.
Figure 3C:
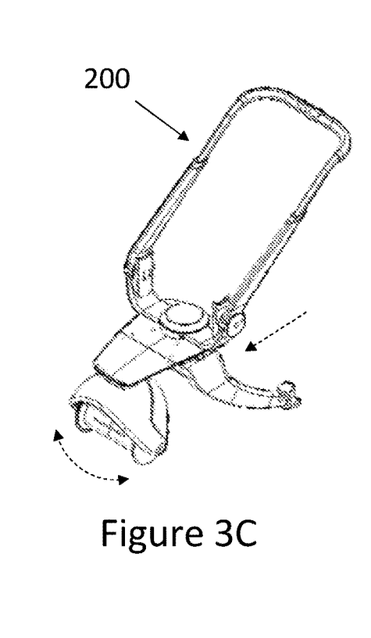
FIG. 3C schematically depicts the pram frame of FIG. 2A in which driven steering is provided for a second roller set according to an exemplary embodiment.
Figure 3D:
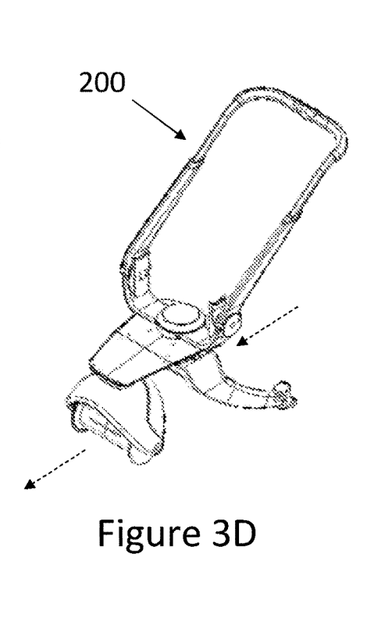
FIG. 3D schematically depicts the pram frame of FIG. 2A in which driven steering is provided for the first roller set and the second roller set according to an exemplary embodiment.

FIG. 2A schematically depicts the pram frame 200 according to an exemplary embodiment without the features of the seat 111, basket 112, bar 113, hood 114 and roller sets 121, 122 shown in FIG. 1 as part of the pram 100. FIG. 2B shows a rear perspective of the pram frame 200.

The pram frame 200, as shown in FIG. 2A, comprises two roller attachment points: a first roller attachment point 221 and a second roller 222 attachment point. The first roller attachment point 221 is configured to engage with the first (e.g. front) roller set 121, and the second roller attachment point 222 is configured to engage with the second (e.g. rear) roller set 122. The first and second attachment points 221, 222 both allow roller sets to be attached to the pram frame 200, as shown in FIG. 1. The roller attachment points 221, 222 may allow, for example, rollers to be screwed or welded or otherwise connected to the pram frame 200. The pram frame 100200 may comprise only one roller attachment point, so that only a single roller set may be attached to the pram frame 200. The roller attachment points 221, 222 may allow the roller sets to be removably attached. For example, it may be possible for the user to change a given roller set. In one case, the user may change the first roller set 121 to another first roller set comprising rollers of a larger diameter than the first roller set 121, or the user may change a given roller set for maintenance or repair.

The pram frame 200 comprises a plate 211 that connects the roller sets 121, 122 to each other and to which other parts of the pram 100, such as the seat 111 and basket 112, may be attached. The inclusion of the plate 211 improves the structural strength of the pram frame 200. The plate 211 is not restricted to a particular size or geometry. Another type of connecting or supporting structure could be used.

The pram frame 200 comprises a plate 211 that connects the roller sets 221, 222 to each other and to which other parts of the pram 100, such as the seat 111 and basket 112, may be attached. The inclusion of the plate 211 improves the structural strength of the pram frame 200. The plate 211 is not restricted to a particular size or geometry. Another type of connecting or supporting structure could be used.

As shown in FIGS. 1 2A and 2B, the first roller attachment point 221 typically is at the front of the pram frame 200 and the second roller attachment point 222 is at the rear of the pram frame 200, the front of the pram frame 200 corresponding to the direction in which the pram 100 is pushed by the user (i.e. the direction in which the user is headed). However, this designation is arbitrary. Either roller set may comprise one or more of wheels, tracks and balls.

Preferably, as shown in FIG. 1, the first roller set 121 comprises a ball, whereby the first roller attachment point 221 is configured to engage with the ball. By engaging with a single ball as the first roller set 121, the pram frame 200 allows the pram 100 to be more easily manoeuvred around corners and sharp bends compared with a typical pram frame configured to engage with two wheels at the front of a conventional pram. Similarly, as the pram frame 200 is preferably configured to engage with a ball as the first roller set 121, the user can pivot the pram frame 200 about the ball as the first roller set 121 in order to change the direction the pram 100 is facing. Consequently, the user can change the direction in which they are headed quickly and easily, without having to resort to, for example, lifting the pram 100 (including the pram frame 200) as described in Background to the Invention. The ball may also be inflatable and comprise a valve. The valve allows the air pressure of the ball to be adjusted. Thus, the air pressure of the ball can be customised for the environment in which the pram 100 is being used. For example, a deflated ball may be suitable for use in a rocky terrain to mitigate disruption or damage to the cargo of the pram 100 (e.g. a baby or child) as a result of travel over obstacles. Generally, an inflatable ball, as opposed to a hard ball, allows for greater ride comfort and usability.

Preferably, as shown in FIG. 1, the second roller set 122 comprises a set of wheels, whereby the second roller attachment point 222 is configured to engage with the set of wheels. As the pram frame 200 is able to engage with a set of wheels, the pram frame 200 engenders stability of the pram 100. Such stability may be particularly useful in the case that the first attachment point 221 is configured to engage with a ball as the first roller set 121. In other words, the combination of the first attachment point 221 being configured to engage with a ball and the second attachment point 222 being configured to engage with a set of wheels means that the pram frame 200 facilitates the user being able to easily change direction by pivoting the pram frame 200 about the ball without any strength being required on the part of the user to prevent the pram 100 from tipping over, due to the stability provided by the set wheels.

As shown in FIG. 2A, and in more detail in FIG. 3, the pram frame 200 comprises a mechanism 231 located on the plate 211 configured to engage with the first roller set 121 via the first roller attachment 221 point. Engagement of the first roller set 121 with the mechanism 231 may be via cables, pulleys or wires, for example. The mechanism 231, in response to a steering input received by the pram frame 200 from the user, causes the orientation of the first roller set 121 to change, such that the direction of travel of the pram 100 is changed. In this way, when a user steers the pram frame 200 during steering the pram 100, driven steering of the first roller set 121 is provided. The driven steering of the first roller set 121 may be provided either by driving the first roller attachment point 221 or by driving the first roller set 121 when engaged with the roller attachment point 221 or mechanism 231. The mechanism 231 itself is described in more detail by way of reference to FIG. 4.

The pram 100 can be steered (i.e. the steering input can be provided) using a steering input device, handle or lever 241 attached to the mechanism 231 via arms 251, 252. By turning the steering input device 241, by means of the mechanism 231, the user can cause the first roller set 121 to orientate in a desired direction via the first roller attachment point 221 to provide driven steering of the first roller set 121.

The mechanism 231, as shown in FIG. 2A, is housed in a housing. The housing protects the mechanism 231 from the environment. For example, the housing prevents debris from accumulating around the mechanism 231. The housing is typically made from plastic, because it is light and weather-resistant, but the housing may be made of any material capable of protecting the mechanism 231 from the environment. The housing may be removable by the user for cleaning and maintenance of the pram frame 200.

In addition to or instead of engaging with the first roller set 121, the mechanism 231 may be configured to engage with the second roller set 122. The mechanism 231 engages with the second roller set 122 via the second roller attachment point 222 in the same way as described for the first roller set 121 with respect to the first roller attachment point 221 (e.g. via cables, pulleys or wires). Therefore, steering of the pram 100 controls the orientation of the second roller set 122 to change the direction of travel of the pram 100 such that driven steering of the second roller set 122 is provided. The driven steering of the second roller set 122 may be provided either by driving the second roller attachment point 222 or by driving the second roller set 122 when engaged with the mechanism 231.

The user may be able to choose between providing driven steering and using the pram frame 200 without driven steering. The user may be able to choose between these two states by using a user input device 242. The user input device 242 may be a grip, button, paddle or electronic device. The mechanism 231 engages with the user input device 242 (e.g. via cables, pulleys or wires, or even wirelessly), and, depending on the input received from the user by the user input device 242, the mechanism 231 provides driven steering. As discussed, the mechanism 231 may be configured to engage with the first roller set 121, the second roller 122 set or both the first roller set 121 and the second roller set 122. Similarly, in response to the user input received by the mechanism 231 from the user input device 242, the mechanism 231 may be configured to select driven steering of the first roller set 121, the second roller 122 set or both the first roller set 121 and the second roller set 122. In other words, the user can select which roller set is provided with driven steering by using the user input device 242 to change the interaction of the mechanism 231 with the first 221 and/or second roller 222 attachment points to which the roller sets of the pram 100 are attached. These various scenarios are shown by FIGS. 3A, 3B, 3C and 3D: in FIG. 3A no driven steering is provided (no driven steering is indicated by curved dashed arrow); in FIG. 3B driven steering is provided for the first roller set 121 (driven steering is indicated by straight dashed arrow); in FIG. 3C driven steering is provided for the second roller set 122; and in FIG. 3D driven steering is provided for the first roller set 121 and the second roller set 122. By being able to control which of the roller sets are provided with driven steering a user is more easily able to direct a pram 100 when pushing it forwards or pulling it backwards, or generally steer or manoeuvre the pram 100 in different scenarios. This might be user-specific, or condition-specific. For example, one setting may be preferred or better for jogging or running, whereas another setting maybe preferred for tricky terrain or a heavier load.

The first roller set 121, the second roller set 122 or both the first roller set 121 and the second roller set 122 may be configured to be locked in a state for driven steering. For example, the pram frame 200 may comprise a locking lever, locking button or similar 243 to, in the event that driven steering has been selected, lock one of or both roller sets in a state for driven steering. In this way, the user can push the pram 100 with one or both roller sets provided with driven steering without having to continuously select driven steering using the user input device 242. The locking lever 243, for instance, may also fix one of both roller sets in a particular orientation so that the direction of travel of the pram 100 does not change regardless of the steering input.

The location of the user input device 242 and the locking lever, locking button or the like 243 is not important, but is typically near the part of the pram frame 200 pushed by the user, such as the steering input device 241, to enable the user to easily select driven steering and lock one of or both the roller sets in a state or driven steering as the user is pushing the pram 100.

Typically, in the event that driven steering is selected for the first roller set 121 and the second roller set 122, a ratio of driven steering of the first roller set 121 with respect to the second roller set 122 is the same. The ratio of the driven steering of the first roller set 121 with respect to the second roller set 122 being the same means that when steering is performed by the user, such as by moving a steering input device 241, the change in orientation caused by the movement of the steering input device 241 for the first roller set 121 is the same as the change in orientation caused by the movement of the steering input device 241 for the second roller set 122. For example, rotating the steering input device 241 through 30° for a pram 100 being initially pushed in a straight line causes both the first roller set 121 and the second roller 122 set to rotate through 30° such that the pram 100 turns to the right. This might provide an improved or simply different driving or steering experience.

In the event that driven steering is selected for the first roller set 121 and the second roller set 122, the ratio of driven steering of the first roller set 121 with respect to the second roller 122 set may be different. For example, rotating the steering input device 241 through 30° for a pram 100 being initially pushed in a straight line causes the first roller set 121 to rotate by 40° and the second roller 122 set to rotate through 30° such that the pram 100 turns to the right, but in a more gradual manner. This might provide an improved or simply different driving or steering experience. This different ratio could be achieved via the mechanism 231, for example the mechanism driving different components in different ways, or to different extents.

The ratio may be fixed and/or adjustable, for example at the user input device 242, or at the mechanism 231. This could be factory set or adjustable, or user-adjustable.

Alternatively or additionally, different means of controlling the orientation of the first roller set 121 and the second roller set 122 may be provided, such as two different steering input devices 241.

The mechanism 231 may be configured to apply a scale factor such that the sensitivity of the driven steering of the pram frame 200 by the user is defined by the scale factor. For example, rotating the steering input device 241 through 30° may cause one or both or the roller sets to rotate through 15°, thereby applying a scale factor of 0.5. The scale factor may be fixed and/or adjustable, for example at the user input device 242 or at the mechanism 231. This could be factory set or adjustable, or user-adjustable. In other words, the scale factor may have a set value that cannot be changed or the user may be able to freely change the scale factor or the user may be able to change the scale factor from an initial value to a different value to which the scale factor is then permanently or temporarily set. The same is true for the ratio described above.

Figure 4:
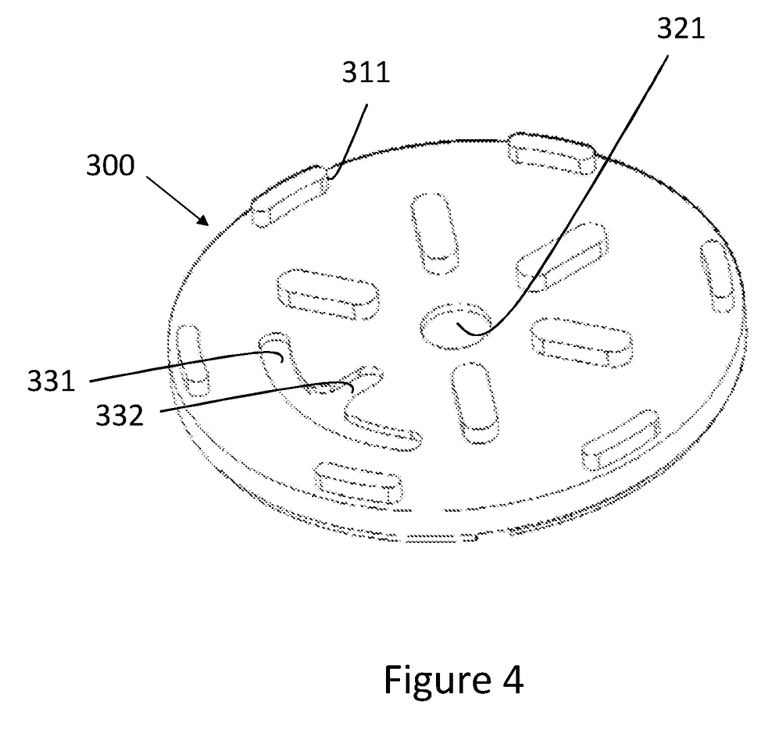
FIG. 4 schematically depicts an actuator component of a mechanism of the pram frame of FIGS. 1, 2 and 3 according to an exemplary embodiment.

FIG. 4, as mentioned above, relates to the mechanism 231 of the pram frame of FIGS. 1, 2, 3A, 3B, 3C and 3D in more detail. FIG. 4 schematically depicts an actuator component 300 of a mechanism 231 of the pram frame 200. In FIGS. 1, 2, 3A, 3B, 3C and 3D, this component of the mechanism 231 is concealed by the housing. The actuator component 300 comprises protrusions 311 around the circumference and arranged about its centre to enable the actuator component 300 to be fitted to the housing. The protrusions 311 may be raised from a surface of the actuator 300, as shown in FIG. 4, but may also be depressed from the surface. The spatial distribution of the protrusions 311 with respect to their position on the surface of the actuator component 300 is not limited to that shown in FIG. 4. These protrusions 311 may also facilitate interactions with other actuators or components with geometrically complementary features, for example. The actuator component 300 is configured to rotate about an axle provided through a central hole 321 in the actuator component 300.

The actuator component 300 comprises a curved slot 331 and a straight slot 332. A pin (not shown) is configured to controllably sit in either the curved slot 331 or the straight slot 332 depending on whether driven steering is provided. The pin is configured to separately engage or generally interact with the steering input device 241 and the user input device 242 via, for example, cables, pulleys or wires (or even wirelessly controlled actuators) separately connecting each of the steering input device 241 and the user input device 242 with the pin. For example, the pin may be configured to engage or generally interact with the steering input device 241 and the user input device 242 via respective cables running up the inside of the arms 251, 252. Similarly, the pin may be configured to be separately engage or generally interact with the locking lever 243 by cables running up the arms 251, 251. The pin is also configured to engage or generally interact with one of the first roller set 121 and the second roller set 122. For instance, the mechanism 231 may comprise one actuator component 300 for each roller set for which driven steering to be provided. Therefore, the pin of one actuator component 300 may be configured to engage with the first roller set 121, and the pin of a second actuator component 300 may be configured to engage with a second roller set 122, both pins also being configured to separately engage with the steering input device 241, user input device 242 and locking lever 243 as described. Alternatively, the same pin might engage with (e.g. extend in or through) multiple-like actuator components 300 stacked on top of one another. The exact arrangement may depend on the overall flexible or fixed functionality that the pram is to provide.

When driven steering is not provided the pin sits in the curved slot 331, meaning that the pin can move along the length of the curved slot 331, or in other words the actuator component 300 is free to move without being stopped by the pin. Hence the particular roller set with which the pin is configured to engage via the corresponding roller set attachment point by means of cables, pulleys or wires, is not restricted to a particular orientation. By using the input device, 241 the user can urge (e.g. push or pull) the pin into the straight slot 332. Consequently, any movement of the steering input device 241, which is configured to engage with the pin, when the pin is in the straight slot 332 causes the actuator component 300 to rotate about the axle and hence cause the corresponding roller set to change its orientation accordingly to provide driven steering. The rotation of the actuator component 300 when the pin is in the straight slot 332 corresponds to the rotation of the steering input device 241.

Use of the locking lever 243 may prevent the pin from leaving the straight slot 332. In one example, the pin may be permanently in the straight slot 332 so that driven steering is permanently provided for the corresponding roller set. In the case of permanent driven steering for one or more roller sets 121, 122 the mechanism 231 may be absent from the pram frame 200, or a simpler mechanism may be used that does not provide or include selection functionality. These configurations may advantageously facilitate a lighter pram frame 200 due to the absence of the mechanism 231. Of course, a combination could be used, as alluded to elsewhere in this disclosure: one roller set always has driven steering, whereas another roller set has selectively driven steering.

The sensitivity of the mechanism 231 may be controlled by, for example, changing the length of the cables, pulleys or wires connecting the mechanism 231 to the steering input device 241. Alternatively, the sensitivity of the mechanism 231 may be controlled by having two actuator components corresponding to each roller set. The first of these actuator components may be configured to engage with the steering input device 241 and the second actuator component by means of a set of teeth, and the second actuator component may be configured to engage with the first actuator component by means of a set of teeth and engage with a roller set. By changing the intervals of the set of teeth of one or both of the first and second actuator components, the rotation imparted by the first actuator by using the steering input device 241 to the second actuator may be changed.

Similar approaches could be applied to fix or control ratios of steering between roller sets, or the components could simply be of different fixed or configurable sizes, such that the same rotation of each component brings about a different gearing or similar in the output to the roller sets.

The driven steering may be selected remotely using an electronic device, such as a smart phone, wireless connectable to the mechanism through a controller of the mechanism. As discussed above, a more mechanical approach could be used.

It will be appreciated that it is likely that a pram frame 200 and overall pram 100 would be made by the same manufacturer. However, a pram frame and the overall pram could be made by different entities. It is clear that the inventive concepts described above apply to the pram frame 200, and/or the overall pram 100, and that the pram frame 200 could be formed separately to, or integrally with, the overall pram 100.

Although a preferred embodiment has been shown and described, it will be appreciated by those skilled in the art that various changes and modifications might be made without departing from the scope of the invention, as defined in the appended claims and as described above.

In summary, the invention provides a pram frame that enables selectable and lockable driven steering of one or more roller sets suitable for use in a variety of terrains such that the manoeuvrability of the pram is improved.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. A pram frame comprising:
    a first roller attachment point configured to engage with a first roller set; and
    a second roller attachment point configured to engage with a second roller set, the first roller attachment point being at a front of the pram frame and the second roller attachment point is at a rear of the pram frame, the front of the pram frame being the direction in which the pram frame is pushed by a user;
    a mechanism configured to engage with the first roller set via the first roller attachment point,
    wherein the mechanism is configured to provide driven steering of the first roller set in response to a steering input to the pram frame using a pram frame handle that is attached to the mechanism; and
    a plate that connects the first and second roller sets to each other, and configured to attach with a pram seat of the pram frame,
    wherein the mechanism is attached to the plate, and located away from the first roller attachment point, and located under the pram seat, when the pram seat is attached to the plate.

2. The pram frame of claim 1, wherein the mechanism is configured to engage with the second roller set via the second roller attachment point.

3. The pram frame of claim 2, wherein the mechanism is configured to provide driven steering of the second roller set in response to the steering input to the pram frame.

4. The pram frame of claim 3, wherein:
    the mechanism is configured to engage with a user input device; and
    the mechanism is configured to select driven steering of at least one of the first roller set and the second roller set in response to a user input received by the user input device.

5. The pram frame of claim 4, wherein at least one of the first roller set and the second roller set is configured to be locked in a state for driven steering when driven steering is selected.

6. The pram frame of claim 4, wherein, when driven steering is selected for the first roller set and the second roller set, a ratio of driven steering of the first roller set with respect to the second roller set is the same.

7. The pram frame of claim 4, wherein, when driven steering is selected for the first roller set and the second roller set, a ratio of driven steering of the first roller set with respect to the second roller set is different.

8. The pram frame of claim 1, wherein the first roller attachment point is configured to engage with a ball as the first roller set.

9. The pram frame of claim 1, wherein the second roller attachment point is configured to engage with a set of wheels as the second roller set.

10. The pram frame of claim 1, wherein the mechanism comprises one or more actuators for interacting with at least one of the first roller attachment point and the second roller attachment point.

11. The pram frame of claim 1, wherein a sensitivity of the driven steering provided by the mechanism is defined by a scale factor.

12. The pram frame of claim 11, wherein the scale factor is at least one of fixed and adjustable.

13. A pram comprising:

a pram frame, the pram frame comprising:

a first roller attachment point configured to engage with a first roller set; and a second roller attachment point configured to engage with a second roller set, the first roller attachment point being at a front of the pram frame and the second roller attachment point is at a rear of the pram frame, the front of the pram frame being the direction in which the pram frame is pushed by a user;

a mechanism configured to engage with the first roller set via the first roller attachment point, wherein the mechanism is configured to provide driven steering of the first roller set in response to a steering input to the pram frame using a pram frame handle that is attached to the mechanism; and a plate that connects the first and second roller sets to each other, and configured to attach with a pram seat of the pram, wherein the mechanism is attached to the plate, and located away from the first roller attachment point, and located under the pram seat, when the pram seat is attached to the plate.

14. The pram of claim 13, wherein the mechanism is configured to engage with the second roller set via the second roller attachment point.

15. The pram of claim 14, wherein the mechanism is configured to provide driven steering of the second roller set in response to the steering input to the pram frame.

16. The pram of claim 15, wherein:

the mechanism is configured to engage with a user input device; and the mechanism is configured to select driven steering of at least one of the first roller set and the second roller set in response to a user input received by the user input device.

17. The pram of claim 16, wherein at least one of the first roller set and the second roller set is configured to be locked in a state for driven steering when driven steering is selected.

\* \* \* \* \*